(12) United States Patent
Shahar et al.

(10) Patent No.: US 7,800,071 B2
(45) Date of Patent: *Sep. 21, 2010

(54) METHOD, APPARATUS, AND SYSTEM OF REDUCING POLARIZATION IN RADIATION DETECTORS

(75) Inventors: Arie Shahar, Moshav Magshimim (IL); Uri El-Hanany, Rehovot (IL); Eliezer Traub, Ramat Gan (IL); Peter Rusian, Ashdod (IL); Zeev Gutman, Kfar Mordechi (IL)

(73) Assignee: Orbotech Medical Solutions Ltd., Rehovot (IL)

( * ) Notice: Subject to any disclaimer, the term of this patent is extended or adjusted under 35 U.S.C. 154(b) by 0 days.

This patent is subject to a terminal disclaimer.

(21) Appl. No.: 12/632,830

(22) Filed: Dec. 8, 2009

(65) Prior Publication Data

US 2010/0086098 A1 Apr. 8, 2010

Related U.S. Application Data

(63) Continuation of application No. 11/964,059, filed on Dec. 26, 2007, now Pat. No. 7,652,258.

(60) Provisional application No. 60/879,388, filed on Jan. 8, 2007.

(51) Int. Cl.
*G01T 1/24* (2006.01)
(52) U.S. Cl. .................................. 250/370.01
(58) Field of Classification Search ................
250/370.01–370.15, 591; 378/98.8
See application file for complete search history.

(56) References Cited

U.S. PATENT DOCUMENTS

| 5,905,772 | A | 5/1999 | Rutten et al. |
| 6,268,614 | B1 * | 7/2001 | Imai ........................ 250/591 |
| 6,373,064 | B1 * | 4/2002 | Yao et al. ............... 250/370.13 |
| 2005/0014995 | A1 | 1/2005 | Amundson et al. |
| 2008/0315106 | A1 | 12/2008 | Buchinsky |

FOREIGN PATENT DOCUMENTS

| JP | 2004146769 | | 5/2004 |
| JP | 2004146769 | A * | 5/2004 |

OTHER PUBLICATIONS

Non-final Office Action for U.S. Appl. No. 11/964,059 mailed on Jul. 11, 2008.
Final Office Action for U.S. Appl. No. 11/964,059 mailed on Nov. 5, 2008.
Non-final Office Action for U.S. Appl. No. 11/964,059 mailed on Apr. 9, 2009.

* cited by examiner

*Primary Examiner*—David P Porta
*Assistant Examiner*—Kiho Kim
(74) *Attorney, Agent, or Firm*—Shiloh et al.

(57) ABSTRACT

Method, apparatus and system for reducing or preventing polarization in semiconductor radiation detectors for medical imaging. For example, an apparatus includes a semiconductor with electrodes coupled thereto, configured to generate an electrical signal in the electrodes in response to absorption of ionizing radiation in the semiconductor, wherein the absorption of the ionizing radiation generates a space charge in the semiconductor; and an infra-red (IR) generator configured to generate IR radiation of a selectable wavelength, the selectable wavelength being chosen so as to at least partially reduce an effect of the space charge on the electrical signal.

20 Claims, 5 Drawing Sheets

SIDE VIEW

FIG. 4b

TOP VIEW

FIG. 4c

FIG. 4d
SIDE VIEW

FIG. 4e
TOP VIEW

METHOD, APPARATUS, AND SYSTEM OF REDUCING POLARIZATION IN RADIATION DETECTORS

CROSS-REFERENCE TO RELATED APPLICATIONS

This application is a continuation application of U.S. patent application Ser. No. 11/964,059 filed Dec. 26, 2007, which claims the benefit of U.S. Provisional Patent Application No. 60/879,388 filed on Jan. 8, 2007 and entitled "Prevention of Polarization in Radiation Detectors", the entire disclosure of which is incorporated herein by reference.

FIELD

Embodiments of the invention relate to semiconductor radiation detectors, and in particular to photon counting detectors in the field of medical imaging.

BACKGROUND

A semiconductor radiation detector may be used to detect photons for medical imaging systems. Photons of ionizing radiation, e.g., X-ray or gamma ray radiation, are absorbed by the semiconductor of the detector and generate measurable electric signals. The energy of the absorbed photon is measured according to the energy level of the signals, and the location of absorption of the photon corresponds to the location of the anodes generating the signal. The energy level and location of the absorbed photons are used for image reconstruction.

Unfortunately, in some cases the semiconductor radiation detector may become polarized, such that measures of the photon energy and/or of the location of the absorption of the photon become inaccurate.

SUMMARY

Some embodiments of the invention provide a method, apparatus, and/or system for reducing and/or preventing polarization in radiation detectors. Some embodiments may be used to substantially reduce the polarization effect by irradiating the semiconductor of the detector with infra-red (IR) radiation. Embodiments of the invention may provide other and/or additional benefits and/or advantages.

In accordance with demonstrative embodiments of the invention, a method for detecting ionizing radiation includes coupling electrodes to a semiconductor so as to generate an electrical signal in the electrodes in response to absorption of the ionizing radiation in the semiconductor, the absorption of the ionizing radiation generating a space charge in the semiconductor; and selecting, in response to the space charge, one or more wavelengths of infra-red (IR) radiation and coupling the IR radiation into the semiconductor so as to at least partially reduce an effect of the space charge on the electrical signal.

In some embodiments, the effect of the space charge may be reduced, for example, by reducing the generated space charge, by introducing further charges into the semiconductor so as to reduce a charge inhomogeneity in the semiconductor, by ionizing trap levels in the semiconductor, and/or by recombining electrons with holes trapped in the trap levels in the semiconductor. For example, the electrons may arrive from the group containing valance and conductive bands of the semiconductor.

In some embodiments, the IR radiation has energy lower than the band-gap energy of the semiconductor.

In some embodiments, coupling the IR radiation into the semiconductor includes coupling the IR radiation via an element selected from a sidewall of a plate comprising the semiconductor, a cathode coupled to the semiconductor, and a cathode contact coupled to the cathode. For example, the cathode electrical-contacts may be made of a metal thin enough to allow transmission of the IR radiation.

In some embodiments, coupling the IR radiation into the semiconductor includes coupling the IR radiation via an element selected from an IR generator, a mirror, a fiber optic, and a slab waveguide. For example, the IR generator may be selected from a group containing light emitting diodes (LED), lasers, and broadband IR sources coupled to IR filters.

In accordance with demonstrative embodiments of the invention, an apparatus for detecting ionizing radiation includes a semiconductor and electrodes coupled thereto which are configured to generate an electrical signal in the electrodes in response to absorption of the ionizing radiation in the semiconductor, the absorption of the ionizing radiation generating a space charge in the semiconductor; and an infrared (IR) generator which is configured to generate IR radiation of a selectable wavelength, the selectable wavelength being chosen so as to at least partially reduce an effect of the space charge on the electrical signal.

In some embodiments, the effect of the space charge may be reduced, for example, by reducing the generated space charge, by introducing further charges into the semiconductor so as to reduce a charge inhomogeneity in the semiconductor, by ionizing trap levels in the semiconductor, and/or by recombining electrons with holes trapped in the trap levels in the semiconductor. For example, the electrons may arrive from the group containing valance and conductive bands of the semiconductor.

In some embodiments, the IR radiation has energy lower than the band-gap energy of the semiconductor.

In some embodiments, the apparatus includes an element via which the IR radiation is coupled into the semiconductor. For example, the element may be an element selected from a sidewall of a plate comprising the semiconductor, a cathode coupled to the semiconductor, and a cathode contact coupled to the cathode. As another example, the element may be an element selected from an IR generator, a mirror, a fiber optic, and a slab waveguide.

In some embodiments, the apparatus includes a fiber optic coupled to the IR generator and to the semiconductor between the electrodes, and which is arranged to convey the IR radiation from the IR generator to the semiconductor. For example, the IR generator may be selected from a group containing, light emitting diodes (LED), lasers and broadband IR sources coupled to IR filters.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Further, reference numerals may be repeated among the figures to indicate corresponding or analogous elements. Moreover, some of the blocks depicted in the drawings may be combined into a single function. The figures are listed below.

DETAILED DESCRIPTION OF EMBODIMENTS

In the following detailed description, numerous specific details are set forth in order to provide a thorough understanding of some demonstrative embodiments. However, embodiments of the invention may be practiced without these specific details. In other instances, well-known methods, procedures, components, units and/or circuits have not been described in detail so as not to obscure the discussion. It is intended that the embodiments and figures disclosed herein be considered illustrative rather than restrictive.

Portions of the discussion herein utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used herein to describe two or more items; for example, a plurality of items includes two or more items.

Although portions of the discussion herein relate to photon counting detectors and to computed tomography (CT) and/or digital radiography (DR) applications, some embodiments may also relate to other types of radiation detectors and/or be applied in other types of imaging systems.

Figure 1:
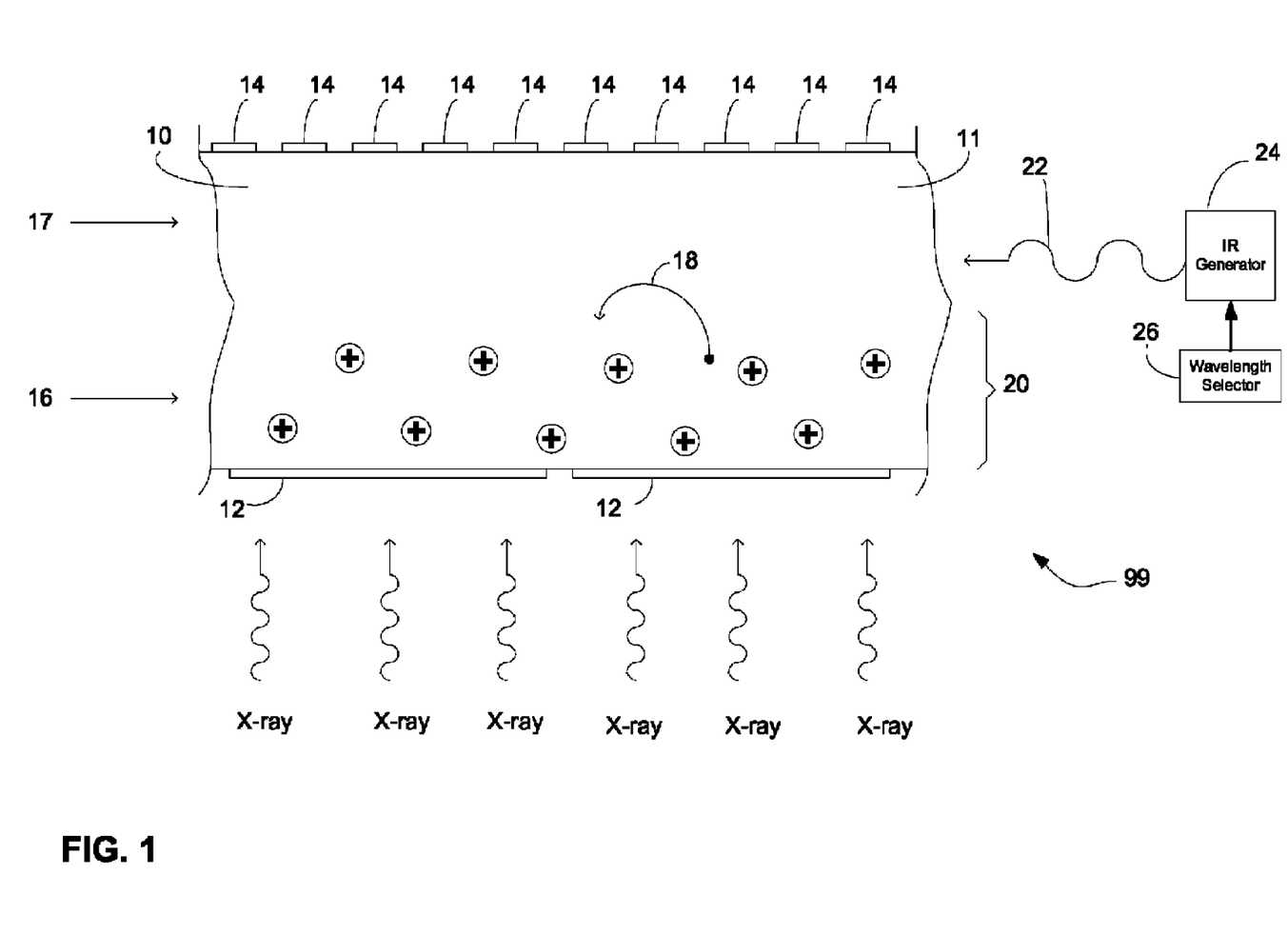
FIG. 1 is a schematic cross-section of a semiconductor radiation detector in accordance with an embodiment of the present invention.

FIG. 1 is a schematic cross-section illustration of a semiconductor radiation detector 99 in accordance with one embodiment of the invention. The detector of FIG. 1 includes a semiconductor plate 10, formed of a semiconductor 11. Electrodes 12 are connected to one side of plate 10, and electrodes 14 are connected to an opposite side of plate 10. In some embodiments, electrodes 14 may be relatively small compared with electrodes 12. Electrodes 12 are configured as cathodes, and herein are also termed cathodes 12. Electrodes 14 are configured as anodes, and are herein also termed anodes 14. In some embodiments, semiconductor 11 is formed of cadmium zinc telluride (CZT), although semiconductor 11 may be any other suitable semiconductor material that detects ionizing radiation, such as silicon and/or germanium.

Plate 10 may be irradiated with ionizing radiation, resulting in electron and hole clouds that are substantially free to move in the plate. An electric field causes the electron and hole clouds to drift, according to their mobility, toward anodes 14 and cathodes 12, respectively. The ionizing radiation may be any suitable radiation that plate 10 is able to absorb and which will generate electron-hole pairs in response, resulting in the electron and hole clouds. For example, such radiation includes, but is not limited to, ultra-violet, X-ray, and gamma ray radiation.

In the following description of detector 99 the ionizing radiation is assumed, by way of example, to comprise X-ray photons, and the photons are assumed to irradiate plate 10 through cathodes 12. Each X-ray photon that is absorbed in the semiconductor plate 11 generates an energetic electron-hole pair, and the pair in turn generates multiple lower energy electron-hole pairs. The electrons and the holes thus generated are collected by anodes 14 and by cathodes 12, respectively. The collected charge at anodes 14 and cathodes 12, induced by the movement of the charge carriers prior to their collection by electrodes 14 and 12, is measured at the anodes to give a measure of the energy of the absorbed photon. The location of absorption of the photon in plate 10 corresponds to the anodes from which the current is collected.

In cases where the flux of X-ray photons is relatively low, the holes of the electron-hole pairs, which have relatively low mobility, may be collected by cathodes 12 and/or may be recombined with electrons in plate 10.

Figure 2:
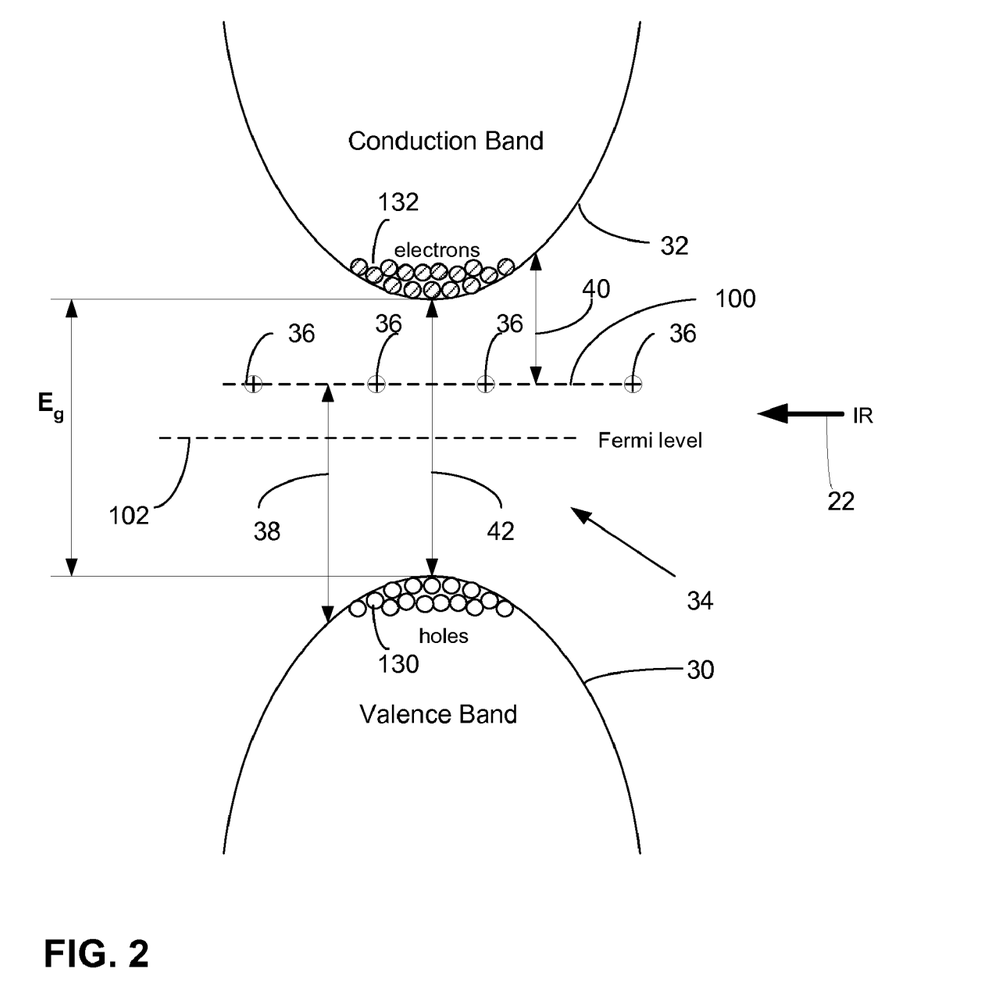
FIG. 2 is a schematic energy diagram showing energy levels in a semiconductor radiation detector in accordance with an embodiment of the present invention.

FIG. 2 is a schematic diagram of energy levels in a semiconductor radiation detector in accordance with an embodiment of the present invention. For example, the energy levels demonstrate cases where the flux of X-ray photons is relatively high, such as occurs in photon counting detectors for computed tomography (CT) applications. Although embodiments of the invention are not limited in this respect, the energy levels illustrated in FIG. 2 may correspond to energy levels in detector 99 of FIG. 1.

As shown in FIG. 2, the semiconductor material has a valence band 30 and a conduction band 32, separated by a bandgap 34. Ionizing radiation absorbed in the semiconductor may cause electrons to jump the bandgap, forming electron-hole pairs, e.g., electrons 132 in conduction band 32 and corresponding holes 130 in valence band 30. In addition, the energy bandgap 34 may include a Fermi energy level 102 and a hole-trap energy level 100.

As shown in FIG. 1, a space charge 20 of holes may form in plate 10 of detector 99 in response to the ionizing radiation. For example, space charge 20 may form in a region 16 close to cathodes 12, since it is in this region that the X-ray photons are generally absorbed. The radiation absorbed in region 16 may ionize some of the atoms in the hole-trap energy level 100.

In some embodiments, hole-trap level 100 may be of a donor type and thus located above Fermi level 102. In cases where detector plate 10 is made from a semiconductor with a low density of majority charge carriers (substantially intrinsic), then Fermi level 102 may be substantially in the middle of bandgap 34. Thus, in some embodiments hole-trap level 100 may be a deep level type despite being above the Fermi level 102.

The absorbed radiation in detector plate 10 may ionize atoms in level 100, which in turn donates electrons to conduction band 32. The resulting positive ions 36 in level 100 are holes in this level. Unlike holes 130 in a valence band 30, the holes in level 100 are not mobile, thus the ionized atoms 36 in level 100 are hole-traps. The holes are trapped in level 100 until they recombine with electrons. For example, electrons may arrive from conduction band 32 or from valence band 30 by transition and neutralize the ionized atoms 36 in level 100. The probability of ionizing atoms in level 100 with the absorbed radiation in region 16 is significantly higher than the probability of ionizing atoms in level 100 with radiation absorbed in a region 17, closer to anodes 14.

Thus, region 17 may be relatively free of trapped holes, so that the distribution of the trapped holes in plate 10 is inhomogeneous. Space charge 20 remains in region 16 because the trapped holes 36 in level 100 (ionized atoms) are not mobile. The Coulomb force tends to spread the space charge by moving mobile holes in the valence band. However, in CZT crystals, for example, the mobility of the holes in the valence band is also relatively low, and thus the space charge is not spread and is not distributed homogeneously over detector plate 10. Accordingly, the space charge may remain in region 16 due to the trapping of holes in level 100, the relative low mobility of the holes, and because holes that are collected by cathodes 12 or that recombine with electrons from the conduction band in region 16 are replenished by new holes generated by the absorption of the X-ray photons.

The trapped-hole space charge, if allowed to remain, may create a polarization effect in sheet 10, e.g., by causing some electrons from the electron-hole pairs generated by X-ray photon absorption in region 16 (where most of the radiation is absorbed) to be attracted to the space charge 20 instead of to anodes 14. A schematic path of such an electron is shown as path 18. Electrons following paths similar to path 18 are thus not collected by anodes 14, so that the polarization effect of the trapped-hole space charge may lead to measures of the X-ray photon energy and of the location of the absorption of the photon becoming inaccurate.

Some embodiments of the invention may reduce or eliminate space charge 20, and/or substantially reduce the polarization effect of the space charge, by irradiating plate 10 with infra-red (IR) radiation 22. The IR radiation is generated by an IR generator 24, and the wavelength of the IR radiation may be selected, e.g., by a wavelength selector 26, according to criteria described in more detail below.

The effect produced by the IR radiation on the semiconductor 11 is explained with reference to the energy diagram of FIG. 2. In the following description, semiconductor 11 is assumed to be formed of CZT material, although embodiments of the invention are not limited in this respect. CZT has a bandgap approximately equal to 1.57 eV.

Holes of trapped-space charge 20 typically occupy deep level traps 36, near the center of the bandgap and above Penni level 102. Transitions, which may be triggered by IR radiation 22, depend on the wavelength of the radiation. In some embodiments, the IR radiation is generated with a selectable wavelength that is chosen, e.g., by wavelength selector 26, so as to trigger a transition that may at least partially reduce an effect of the space charge.

For example, if the IR wavelength is approximately 790 nm or less, corresponding to the CZT bandgap of 1.57 eV, IR photons may be absorbed by CZT semiconductor 11 and thereby cause an electron to transfer from the valence band to the conduction band, so that an electron-hole pair is created. Such a transition is illustrated by line 42. Longer wavelength IR photons, having energy lower than the bandgap 34, may cause transitions, by absorption, of electrons from the valence band 30 to energy level 100 of hole-traps 36. Such a transition is illustrated by line 38. Similarly, even longer wavelength IR photons, having energy lower than both the bandgap 34 and the energy needed for transitions from the valance band 30 to energy level 100, may cause stimulated transitions, by emission, of electrons from the conduction band 32 to energy level 100 of hole-traps 36. Such a transition is illustrated by line 40. Some embodiments may include other possible transitions, such as by absorption/stimulated emission between any possible pairs of energy states depending on the energy of the IR photons.

For each type of transition, the probability of the transition occurring is a function of an absorption/emission cross-section of the wavelength inducing the transition, the density of states, and the charge carrier population of the bands/energy between which the transition take place. For example, for wavelengths of 790 nm or less, the absorption cross-section is relatively large, so that there is a high probability of the transition occurring. In other words, semiconductor 11 is substantially opaque at these IR wavelengths, and the transitions caused by the IR photons generate large numbers of electron-hole pairs. At longer IR wavelengths semiconductor 11 is generally transparent, although at wavelengths corresponding to possible transitions, such as those of line 38, the semiconductor is generally at least partially transparent.

In cases where no IR radiation is applied, the amount of trapped space charge is proportional to the difference between the transitions of electrons out of energy level 100 to other energy states (ionizing atoms in energy level 100 and creating hole traps) and the transitions of electrons from other energy states to energy level 100 (recombination of trapped holes in energy level 100 with electrons, which eliminates the hole traps by neutralizing the ionized atoms in level 100).

When applying IR radiation in addition to the X-rays, the overall effect of the IR irradiation (which may be monochromatic or broad band radiation), is a function of the IR wavelength, the absorption cross-section, the densities of states, and the charge carrier populations in the energy states at the wavelength. In addition, the overall effect is dependent on the mobilities and relaxation times of the resulting electrons and holes. In some embodiments, IR generator 24 and wavelength selector 26 may be used to substantially reduce space charge 20 by selecting the irradiating IR wavelength or spectral band, for instance by using wavelengths corresponding to line 38, and may thus substantially reduce and/or eliminate polarization in the detector.

Alternatively, in some embodiments rather than reducing the space charge itself, IR generator 24 and wavelength selector 26 may be used to effectively eliminate the inhomogeneous effect of the space charge by generating other trapped holes in plate 10 with IR irradiation, for instance by using IR wavelengths corresponding to line 38 or line 40 (having energy lower than the bandgap energy of the semiconductor). In region 16, significant numbers of atoms in energy level 100 are already ionized, and thus the main contribution to ionizing of atoms in level 100 occurs in region 17 and creates a quasi-uniform space charge over all the volume of detector plate 10. Since semiconductor 11 is at least partially transparent to the applied IR radiation 22, the homogenization process of the trapped space charge produced by the IR radiation may exist over all the volume of detector plate 10. For avoiding generation of signals produce by the IR radiation at anodes 14, the preferred energy of IR radiation 22 may be selected to be lower than the energy of the bandgap of semiconductor plate 10.

When a quasi-uniform trapped space charge is formed, e.g., by the IR radiation 22, over a significant fraction of the volume of plate 10, the effect of the trapped space charge on the attraction of the electrons (generated by the absorption of the X-rays) toward anodes 14 may be greatly reduced and may substantially reduce and/or eliminate polarization in the detector.

Figure 3A:
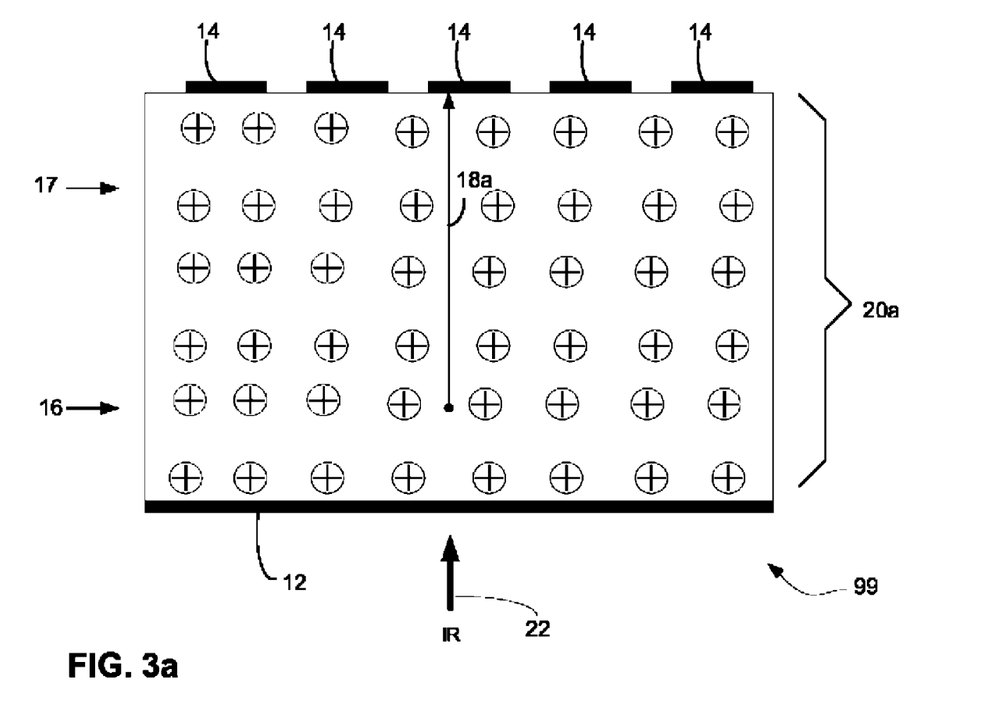
FIG. 3a is a schematic diagram illustrating a trajectory of an electron in a semiconductor radiation detector in accordance with an embodiment of the present invention.

FIG. 3a schematically illustrates a trajectory 18a of an electron in a semiconductor radiation detector 99 according to an embodiment of the present invention. Trajectory 18a shows the drift of the electron toward anode 14 when trapped space charge 20a, produced by the absorbed X-ray radiation and the IR radiation, is distributed substantially quasi-uniformly over plate 10 in regions 16 and 17. For example, in some embodiments the IR radiation 22 may be introduced as described below with reference to FIG. 3b or as described below with reference to FIG. 4a.

Figure 3B:
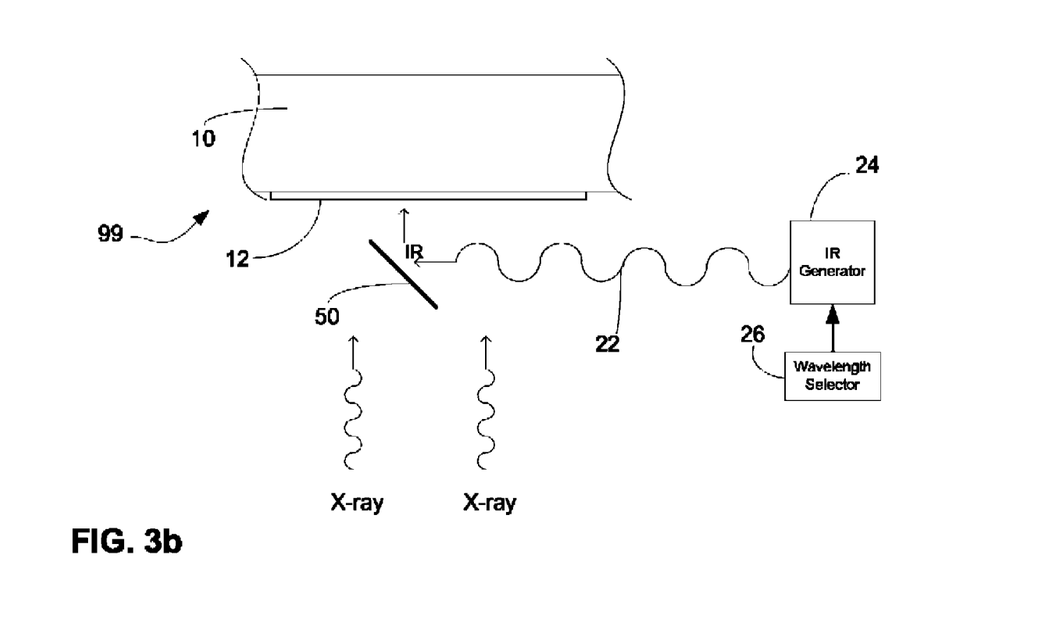
FIG. 3b is a schematic diagram illustrating a method for introducing IR irradiation into a semiconductor radiation detector in accordance with an embodiment of the present invention.

FIG. 3b is a schematic diagram illustrating a method for introducing IR irradiation 22 of selectable wavelength into plate 10 of semiconductor radiation detector 99, according to an embodiment of the present invention. In this example, cathodes 12 are configured as electrodes that are thin enough to allow substantial penetration of IR irradiation. For example, cathodes 12 may have a thickness less than one wavelength of the IR irradiation. For example, in accordance with demonstrative embodiments of the invention, implementing the cathodes from 50 nm platinum may allow satisfactory penetration of IR irradiation without interfering with the function of the electrodes for charge collection and transfer. In some embodiments, as illustrated in FIG. 3b, one or more mirrors 50, selected to be transparent to X-rays and to reflect IR irradiation 22, are oriented and selected to reflect the IR irradiation into plate 10 via cathode 12. For example, this may result in a quasi-uniform distribution of the space charge, as illustrated in FIG. 3a.

Figure 4A:
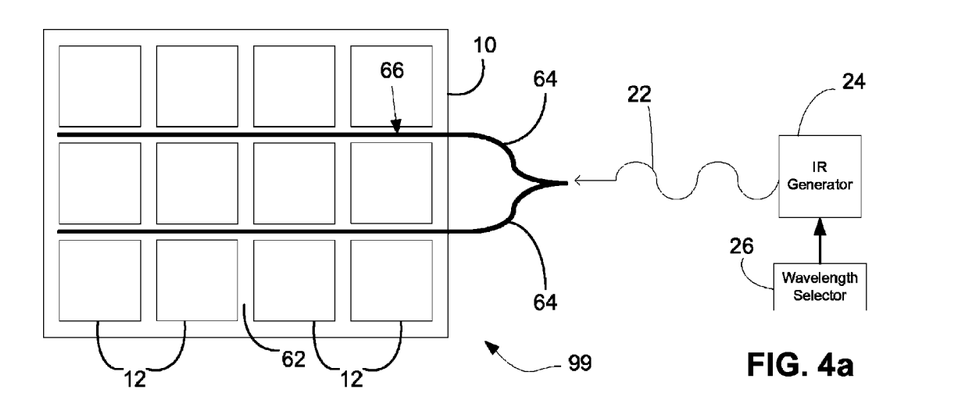
FIG. 4a is a schematic diagram illustrating an alternative method for introducing IR irradiation into a semiconductor radiation detector in accordance with another embodiment of the present invention.

FIG. 4a is a schematic diagram illustrating an alternative method for introducing IR irradiation 22 of selectable wavelength into plate 10 of semiconductor radiation detector 99, according to an embodiment of the present invention. FIG. 4a is a bottom view of an array of cathodes 12, which by way of example are assumed to be square. In this example, cathodes 12 are configured to have narrow spaces 62 between the cathodes, allowing direct access to plate 10. Fiber optics 64 are laid in spaces 62, and the fiber optics are arranged to have diffusive regions 66 along the fiber optics. IR irradiation 22 is introduced into ends of fiber optics 64, and the diffusive regions cause some of the IR irradiation transmitted along the fiber optics to exit the fiber optics into plates 10.

Figure 4B:
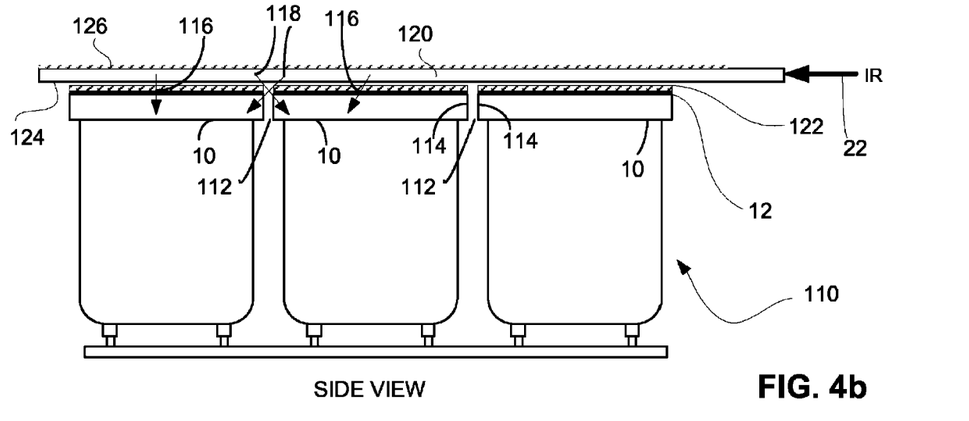
FIG. 4b and FIG. 4c are a schematic side view and a schematic top view, respectively, of the imaging plane of a camera including semiconductor radiation detector modules in accordance with an embodiment of the present invention.
Figure 4C:
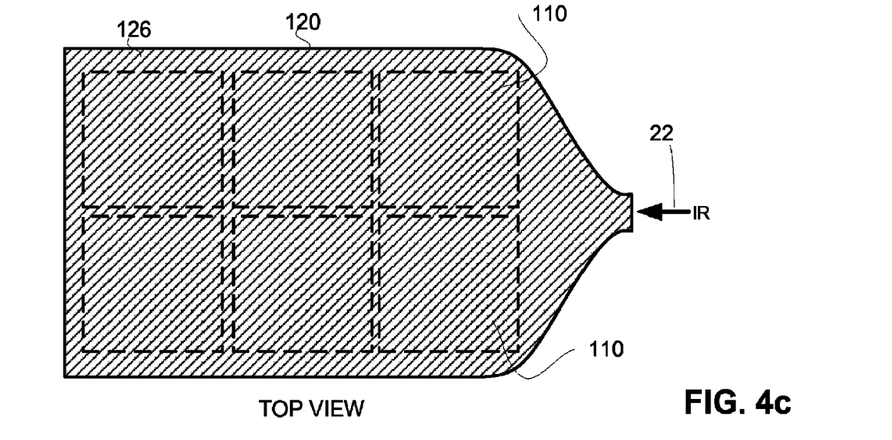

FIG. 4b and FIG. 4c are schematic side and top views, respectively, of the imaging plane of a camera that is formed by butting discreet modules 110 according to an embodiment of the present invention. Detector modules 110, each having a cathode 12, may operate substantially as described above with reference to the semiconductor radiation detector 99 of FIG. 1. In this example, the modules are butted with small gaps 112 between them, allowing IR radiation 22 to penetrate into plates 10 of the modules via sidewalls 114 of plates 10. Alternatively, the IR radiation may be coupled into plates 10 via cathodes 12. The two modes of IR coupling are illustrated by arrows 116 and 118.

The IR radiation 22 may be coupled into plates 10, for either mode, from a slab waveguide 120 having a lower diffused surface 124 covering at least in part the imaging plane of the camera. The other upper surface 126 of the slab waveguide, opposite to the diffused surface, may be formed from a material that reflects the IR radiation. The bias of the negative high voltage may be supplied to the cathodes of the modules 110 by thin cathode plates 122, which are also at least partially transparent to the IR radiation.

Figures 4D, 4E:
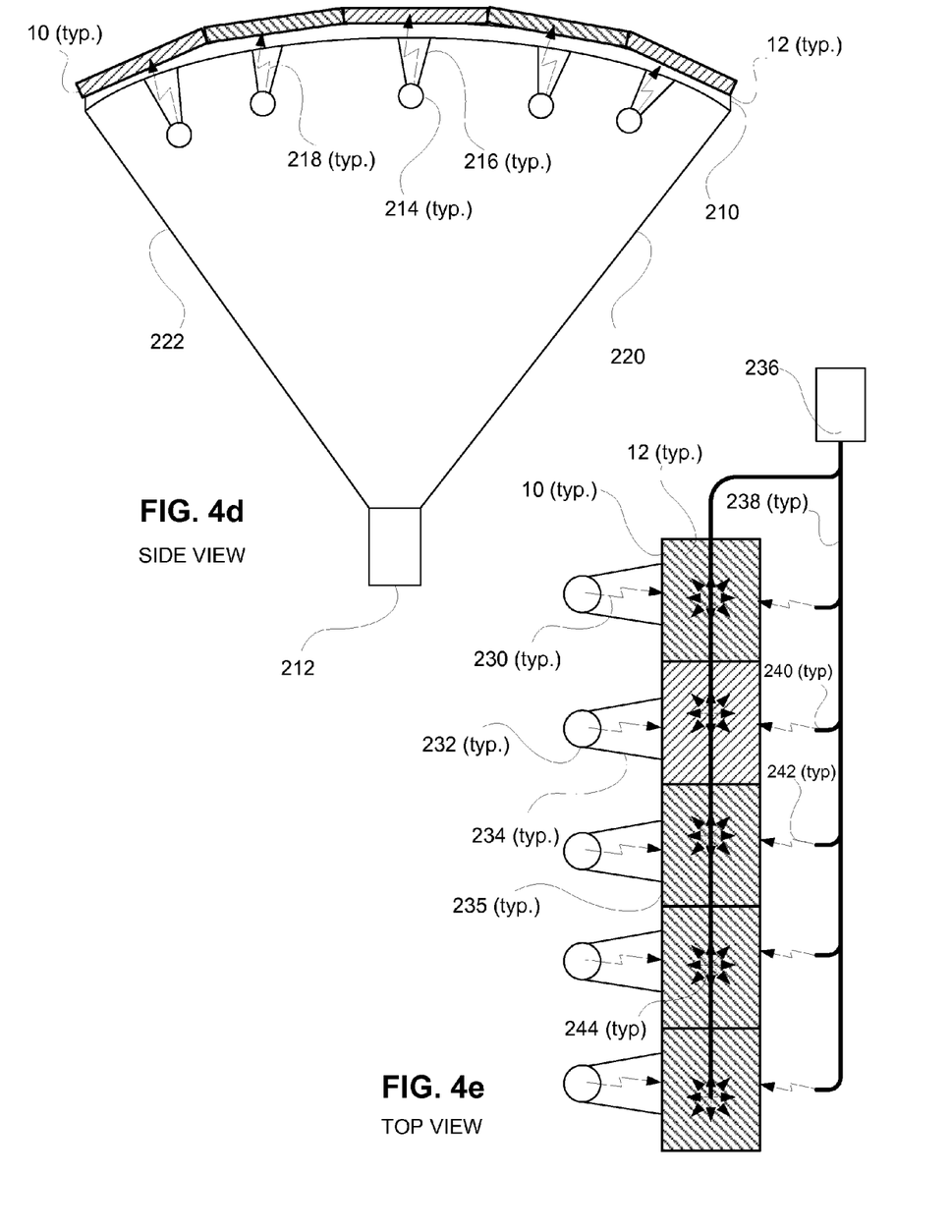
FIG. 4d and FIG. 4e are a schematic side view and a schematic top view, respectively, of IR illumination in medical imaging systems in accordance with an embodiment of the present invention.

FIGS. 4d and 4e schematically illustrate side and top views, respectively, of the IR illumination concept according to an embodiment of the present invention, e.g., as applied in computed tomography (CT) or digital radiography (DR) systems. As shown in FIG. 4d, detectors 10 (typ.) having cathodes 12 (typ.) are mounted on an arc 210 that is connected, by arms 220 and 222, to X-ray tube 212. In a DR system, arc 210 may be a flat plan. IR radiation sources 214 are mounted on arc 210 by mounting fixtures 216 (typ.). In some embodiments, IR radiation sources 214 (typ.) may be, for example, light emitting diodes (LED) or lasers that emit IR radiation 218 (typ.) having wavelength in the desired spectrum range. Alternatively, in some embodiments sources 214 may include arc-lamps or other lamps based on heating elements. In some embodiments, sources 214 may be broadband light sources coupled with IR filters that transmit only the desired IR spectrum range 218.

IR radiation 218 of the desired wavelength irradiates cathodes 12, which are transparent to this radiation. In accordance with some embodiments of the invention, the metal electrical-contact of detector 10 should be thin enough to transmit IR radiation 218, and the packaging cathode plate of cathode 12 should be made from material that is transparent to IR radiation 218.

FIG. 4e shows a top view of radiation sources 232, mounting fixtures 234 and IR radiation 230, which are analog to sources 214, mounting fixtures 216 and IR radiation 218 of FIG. 4d, respectively. In some embodiments, as shown in FIG. 4e, detectors 10 may be irradiated by IR radiation sources 234 through their sidewalls 235 (typ.). As another example of irradiating through sidewalls 235, in some embodiments IR radiation source 236 may be coupled to optical fibers 238 (typ.) that emit IR radiation 242, from their terminals 240, onto sidewalls 235 of the detectors 10. Similarly, in some embodiments cathode illumination may be produced, e.g., by fibers 238 that are coupled to light source 236 on one end and emit IR radiation 244 from surface emitting gratings, produced on the cladding layer of fibers 238, into detectors 10 via their cathodes 12. Some embodiments of the invention may include other suitable methods for introducing IR irradiation 22 of selected wavelength into semiconductor plate 10, substantially without affecting the functionality of the plate as an ionizing radiation detector.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes.

We claim:

1. A method of reducing polarization in a photon counting CdZnTe (CZT) pixilated detector including at least one monolithic semiconductor plate having a monolithic cathode electrode and a pixilated anode with electrodes coupled thereto, wherein the semiconductor plate comprises a trap level having an energy level between a valence band and a conduction band of the semiconductor plate, wherein, in response to absorption of ionizing high flux X-ray radiation in the semiconductor plate, the pixilated detector generates an electrical signal in the anode electrodes by electron motion towards the anodes, wherein the absorption of the high flux X-ray radiation creates an inhomogeneous positive space charge in the semiconductor plate, wherein the inhomogeneous positive space charge produces a polarization effect in the semiconductor plate by an attraction of electrons to the cathode electrode, and wherein the polarization effect causes a reduction in the electron motion towards the anode electrodes, thereby reducing the electrical signal generated in the anode electrodes, the method including:

optically coupling into the semiconductor plate infra-red (IR) radiation of one or more wavelengths, to which the semiconductor plate is at least partially transparent, such that the IR radiation is to ionize the trap level so as to generate trapped positive charges in the semiconductor plate and to homogenize the positive space charge by producing a substantially uniform space charge over substantially the entirety of the semiconductor plate, and so as to reduce the polarization and the attraction of the electrons to the cathode electrode by the inhomogeneous space charge, thereby to improve a drift of the electrons toward the anode electrode.

2. The method according to claim 1, wherein the IR radiation is to homogenize the positive space charge by introducing additional charges into the semiconductor plate so as to reduce a charge inhomogeneity in the semiconductor plate.

3. The method according to claim 1, wherein the IR radiation is to ionize the trap level by causing transitions of electrons from the trap level into the conduction band of said semiconductor plate.

4. The method according to claim 1, wherein the IR radiation is to ionize the trap level by causing transitions of electrons from the trap level into the valence band of said at least one semiconductor plate.

5. The method according to claim 1, wherein coupling the IR radiation includes coupling an IR radiation having an energy lesser than a bandgap energy of said semiconductor plate.

6. The method according to claim 1, wherein coupling the IR radiation into the semiconductor plate comprises coupling the IR radiation via a sidewall of the semiconductor plate.

7. The method according to claim 1, wherein coupling the IR radiation into the semiconductor plate comprises coupling the IR radiation via at least one of an IR generator, a mirror, a fiber optic, and a slab waveguide.

8. The method according to claim 7, wherein said fiber optic includes a surface emitting grating.

9. The method according to claim 1 comprising generating said IR radiation by at least one of one or more light emitting diodes (LED), one or more lasers, and one or more broadband IR sources coupled to IR filters.

10. The method according to claim 1, wherein the at least one semiconductor plate includes a plurality of semiconductor plates arranged in at least one of a linear array, a matrix array and an arc like shape.

11. A computed tomography (CT) system including:

at least one photon counting CdZnTe (CZT) pixilated detector including at least one monolithic semiconductor plate having a monolithic cathode electrode and a pixilated anode with electrodes coupled thereto,     wherein the semiconductor plate comprises a trap level having an energy level between a valence band and a conduction band of the semiconductor plate,     wherein, in response to absorption of ionizing high flux X-ray radiation in the semiconductor plate, the pixilated detector generates an electrical signal in the anode electrodes by electron motion towards the anodes,     wherein the absorption of the high flux X-ray radiation creates an inhomogeneous positive space charge in the semiconductor plate,     wherein the inhomogeneous positive space charge produces a polarization effect in the semiconductor plate by an attraction of electrons to the cathode electrode,     and wherein the polarization effect causes a reduction in the electron motion towards the anode electrodes, thereby reducing the electrical signal generated in the anode electrodes; and     an infra-red (IR) generator to optically couple into the semiconductor plate IR radiation of one or more wavelengths, to which the semiconductor plate is at least partially transparent, such that the IR radiation is to ionize the trap level so as to generate trapped positive charges in the semiconductor plate and to homogenize the positive space charge by producing a substantially uniform space charge over substantially the entirety of the semiconductor plate, and so as to reduce the polarization and the attraction of the electrons to the cathode electrode by the inhomogeneous space charge, thereby to improve a drift of the electrons toward the anode electrode.

12. The system according to claim 11, wherein the IR radiation is to homogenize the positive space charge by introducing additional charges into the semiconductor plate so as to reduce a charge inhomogeneity in the semiconductor plate.

13. The system according to claim 11, wherein the IR radiation is to ionize the trap level by causing transitions of electrons from the trap level into the conduction band of said semiconductor plate.

14. The system according to claim 11, wherein the IR radiation is to ionize the trap level by causing transitions of electrons from the trap level into the valence band of said at least one semiconductor plate.

15. The system according to claim 11, wherein the IR radiation has an energy lesser than a bandgap energy of said semiconductor plate.

16. The system according to claim 11, wherein the IR generator is to couple the IR radiation into the semiconductor plate via a sidewall of the semiconductor plate.

17. The system according to claim 11, wherein the IR generator is to couple the IR radiation into the semiconductor plate via at least one of an IR generator, a mirror, a fiber optic, and a slab waveguide.

18. The system according to claim 17, wherein said fiber optic includes a surface emitting grating.

19. The system according to claim 11, wherein the IR generator includes at least one of one or more light emitting diodes (LED), one or more lasers, and one or more broadband IR sources coupled to IR filters.

20. The system according to claim 11, wherein the at least one semiconductor plate includes a plurality of semiconductor plates arranged in at least one of a linear array, a matrix array and an arc like shape.

* * * * *